United States Patent Office 3,426,175
Patented Feb. 4, 1969

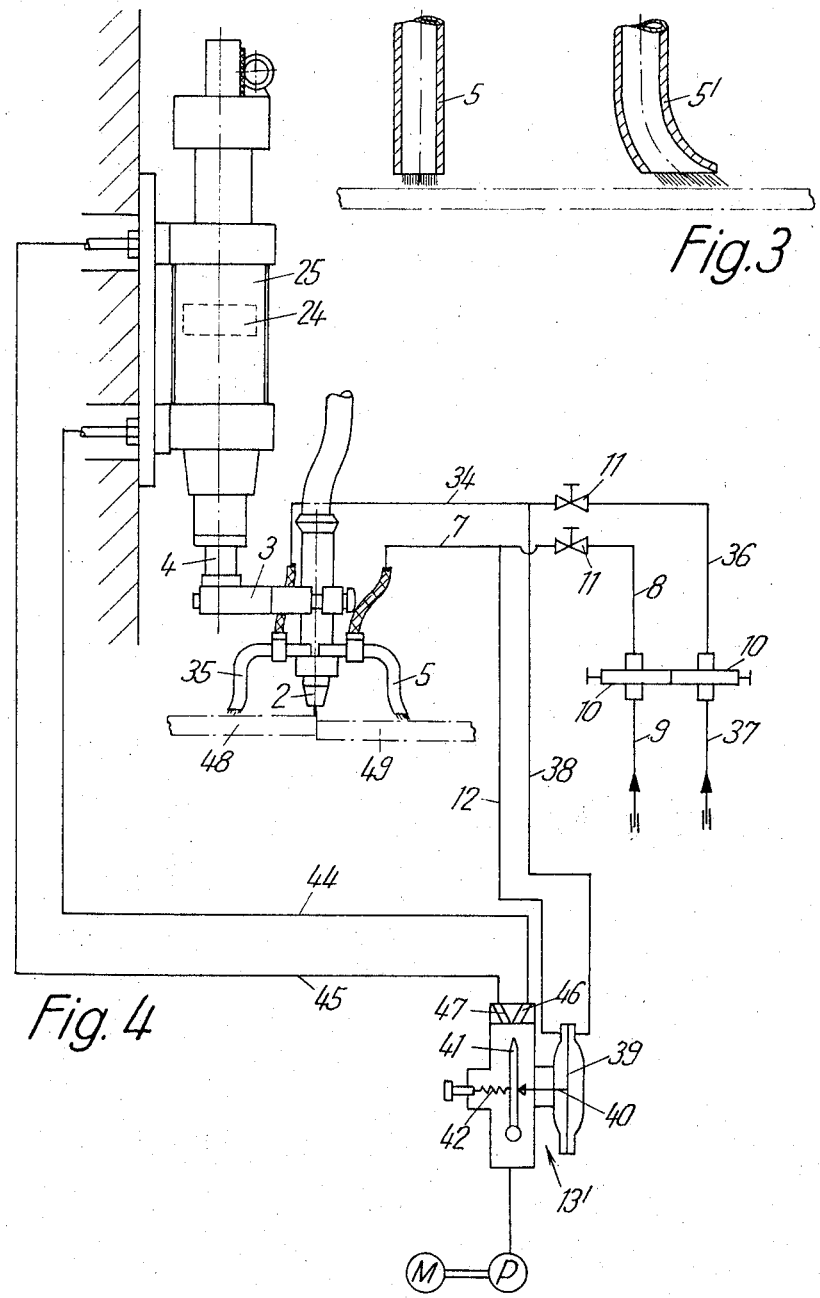

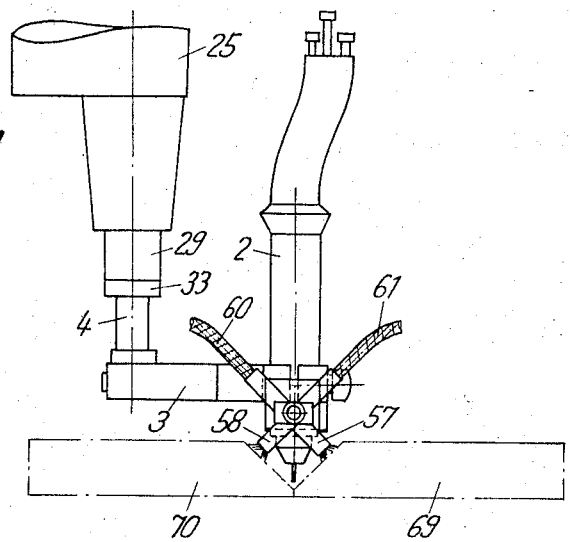
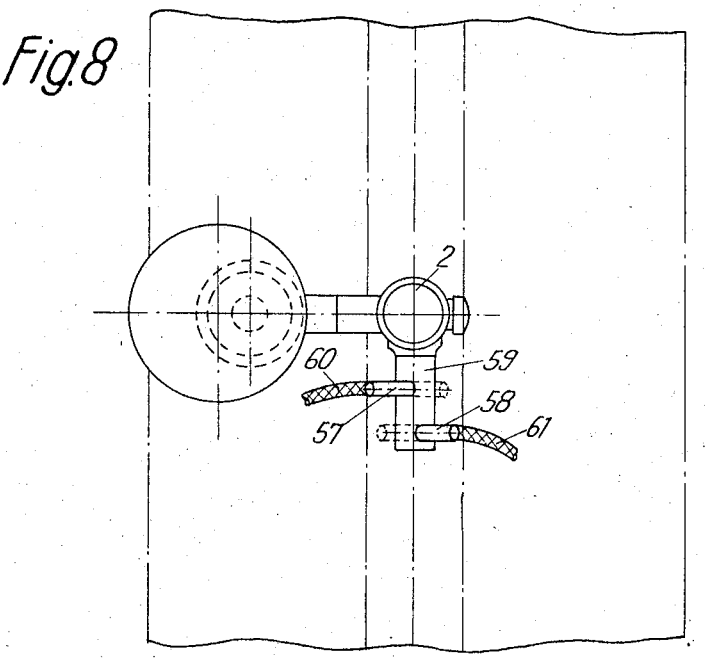

3,426,175
DISTANCE MAINTENANCE DEVICE FOR TORCH
Siegfried Hahne, Rheinkamp-Baerl, Germany, assignor to Messer Griesheim G.m.b.H., Frankfurt am Main, Germany, a corporation of Germany
Filed July 27, 1966, Ser. No. 568,273
Claims priority, application Germany, Aug. 11, 1965, M 66,289
U.S. Cl. 219—125                    10 Claims
Int. Cl. B23k 9/12; H05b 31/18

This invention relates to a device for maintaining the distance between a welding torch, a cutting torch, or the like from the work piece during their relative movement to it.

The maintenance of the once-set, most suitable distance above the work piece surface is necessary for the achievement of good and constant work results over the entire length of the work pieces. With respect to work pieces with very irregular surfaces, the change in height should proceed as inertialess as possible in order that the cutting picture or the welding bath is not affected unfavorably.

In cutting or welding by hand, the required change in height was previously done by the operator with varying degrees of uniformity. In tightly clamped torches and automatic welding or cutting, the adjustment of the torch is done by hand by means of suitable screws or gearings. Some known height adjustments are accomplished by an electric motor which moves, by means of a drive, the torch on slides, in accordance with the control impulses given by keying devices touching the work piece surface at short time intervals. The substitution of mechanical keying devices by a device employing electrical capacity between the work piece and a scanning runner has also been proposed. Furthermore, welding processes operating with the same voltage also use this for regulation purposes.

All these devices have their disadvantages. For example, with some devices the precision is too low and/or its operation too slow; while other devices are influenced in an undesired manner by the flame or the electric arc of the torch under certain circumstances.

An object of this invention is to provide a device which overcomes the above indicated and other disadvantages.

In accordance with this invention at least one Pitot tube is attached to the torch in such a manner that its velocity heat controls a torch height adjustment unit. This conrtol can be by means of intermediary members whose change as compared to a theoretical value, effects a control impulse corresponding to the extent of the change which in turn influences the torch height adjustment unit. With a pneumatically operating device, which is coupled with preferably a hydraulic-activated moving arrangement for the torch, a very quick and sensitive movement is possible which operates unaffected by mechanical transfer errors. A scanning device together with the torch can also be arranged in any desired position with respect to the work piece, and can be employed for example even in overhead welding.

The air jet emitted from the Pitot tube generally may have a diameter of 1 to 3 mm. and the pressure of the air jet may also be kept low, about in the size range of 100 mm. water column. This has the advantage of an easier regulation of the pressure difference, an easier mode of construction of the regulating device, a lower air consumption, and a non-interference of the acetylene flame, the electric arc, or the protective gas stream.

For the carrying out of the invention, the Pitot tube may be fixed to the torch either directly or by intermediate elements. Where required by the sensitivity and quick operability of the control, the Pitot tube can also be arranged beside this torch without considerable lead (as seen in the direction of movement of the torch).

In order to assure avoidance of interference of the flame or the electric arc by the air stream, the nozzle of the Pitot tube may be directed away from the torch according to the invention. The frontal surface of the Pitot tube may be constructed about parallel to the work piece surface so that the same effect is achieved as with a Pitot tube taking a vertical course.

By welding together of work pieces whose surfaces are about flush, a Pitot tube for the control of the torch is sufficient. However, where the surfaces of both work pieces, because of ripples or other roughnesses, happen to be at somewhat different heights to each other, two Pitot tubes may be used which operate on a common control membrane so that an average is formed and the torch is thereby adjusted to an average distance to both of the surfaces. An average adjustment then follows.

Novel features and advantages of the present invention will become more apparent to one skilled in the art from a reading of the following description in conjunction with the accompanying drawings wherein similar reference characters refer to similar parts and in which:

FIG. 3 shows the straight and the bent shape of Pitot tubes usable in the invention;

FIG. 4 is a schematic view showing two Pitot tubes on sheet metal surfaces displaced to each other;

FIG. 7 is an end view of still another embodiment of the invention;

FIG. 8 shows a top view of the embodiment shown in FIG. 7;

Figure 1:
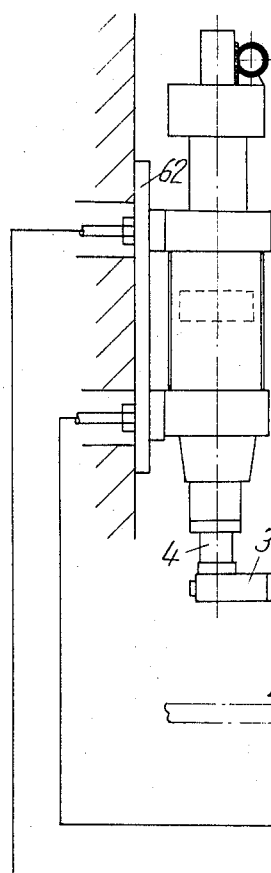
FIG. 1 is a schematic view of one embodiment of the invention.

According to FIG. 1, two pieces of sheet metal, of which only one is shown and designated by 1, are being welded together by means of torch 2. Torch 2 is attached by tightly encircling arm 3 to a vertically slidable bar 4 which is part of the torch height adjustment discussed hereinafter. Torch 2 also includes conduits 26, 27, and 28 for the supply of necessary energy, e.g. electrical stream, protective gas, coolant.

Pitot tube 5 is, for example, clamped to torch 2. Air is supplied to Pitot tube 5 by means of conduits 7, 8, 9, e.g. from a compressed air source. For the reduction of the pressure a pressure reducer 10 is provided in conduit 9, while a throttle 11 is provided in conduit 8. A conduit 12 leads to a diaphragm control 13 which is connected to conduit 7 and has a pressure of for example 100 mm. water column.

This diaphragm control 13 consists of a housing 14, having diaphragm 15 attached therein. Bar 16 attached to diaphragm 15 bears upon control member 17 against the action of spring 18 which is adustable in its biasing force. On the one side of the housing there are located two outlet orifices 19, 20, in communication with conduits 21 and 22, respectively. On the other side of housing 14 is a conduit 23 leading into the housing and to the hollow control member 17 through which oil passes under a predetermined pressure.

Conduits 21, 22 lead to the torch height adjustment device. This device consists according to FIG. 2 of a servo motor (piston 24 with cylinder 25). Each of conduits 21, 22 open out into cylinder 25 on a different side of the piston 24. Piston 24 is attached to a hollow cylinder 29 which on its upper end is provided with a covering plate 30 and which there is attached pinion 31 operable manually or automatically. This pinion 31 is coupled with rack 32 which is screwed on the torch shaft 4. Torch shaft 4 is arranged in the covering plate 30 and slides with respect to piston 24 and the lower covering plate 33. This construction enables an adjustment of the torch height independent of the pressure head control and serves for the rough adjustment prior to the beginning of a work process.

Control member 17 is a known jet regulator. The medium conducted to the control member, preferably oil, is issued with great speed from its nozzle-like narrow tip. The jet meets both scissor-like openings 19, 20 of the same diameter situated side by side. The speed energy of the jet is converted to pressure again in the servo motor 24, 25. The position of the jet tube 17 depends on the force of the measuring system (Pitot tube and membrane) affecting the jet tube 17 on the one side and on the adjusting system (spring 18 adjusted to the desired value) affecting on the other side.

If the velocity head is equal to the desired value, the forces of the measuring system and of the adjusting system are equalized and the jet tube is in center position, the pressure on both conduits 21, 22 and thus on both sides of the piston are equal. As soon as the velocity head is changed, the membrane and the jet tube connected thereto change their position, and more oil passes into one or another of the conduits so that piston 24 and thus also torch 2 change their position.

This control operates practically without friction and with reliability of operation.

The Pitot tube according to FIG. 3 takes into consideration that in welding and cutting an air stream influencing the flame or the electric arc is undesired. Pitot tube 5' is therefore bent away at its lower part from the torch, the frontal surface being constructed plane parallel to the work piece surface. As a result, the outlet orifice has an ellipse-shaped profile. However, any other shapes can be used. FIG. 3 also shows the normal design of Pitot tube 5.

FIG. 4 shows an arrangement for welding together, two sheets of steel 48, 49, whose surfaces are not quite even to each other. In this arrangement two Pitot tubes 5, 35 are employed for the adjustment of the torch to the actual average. Each Pitot tube is provided with a conduit system, 7, 8, 9 and 34, 36, 37, having a pressure reducing valve 10 and a butterfly valve 11. Conduits 12 and 38 each lead to a different side of membrane 39. Attached to the membrane is a rod 40 which bears upon control member 41 which in turn is pressed by spring 42 adjustable according to its power. The spring is adjusted to a predetermined valve which corresponds to the desired distance of the torch from the work piece. If the height difference between the two sheet metal surfaces is changed, the pressures applied to both sides of the membrane are also changed, and the control member is displaced in accordance to the average of both of the pressure head changes and affects the height adjustment device accordingly.

If on the other hand both sheet metal surfaces are raised in the same manner or if they drop down (incline or other elevation), then the pressures on both sides of the membrane are uniformly changed and there results a displacement of the control member with corresponding effect on the height adjustment device.

The control member is dsplaced in the same manner when both surfaces slope upwards as well as when the height difference is changed between the surfaces.

Figure 2:
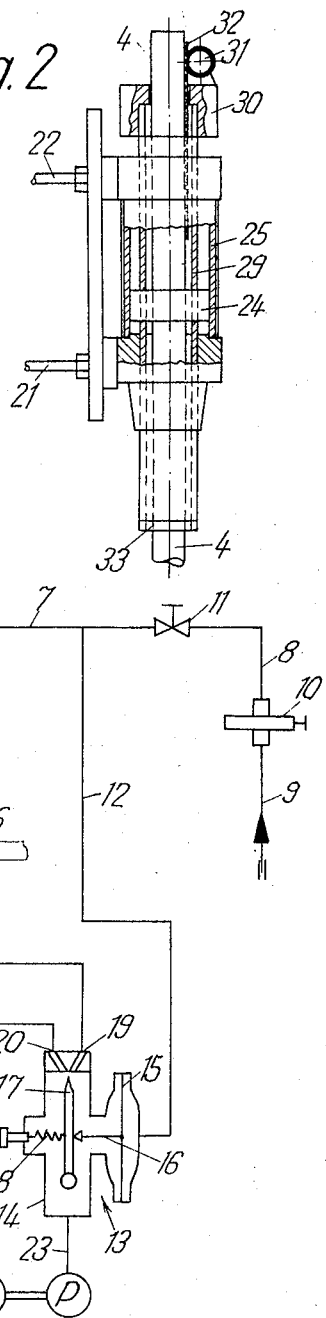
FIG. 2 is a cross-section of the device for height adjustment of the torch of FIG. 1.

From the diaphragm control 42, conduits 44 and 45 (which communicate with the outlet orifices 46 and 47) lead to the servo motor 24, 25 constructed in the manner shown in FIG. 2.

Figure 5:
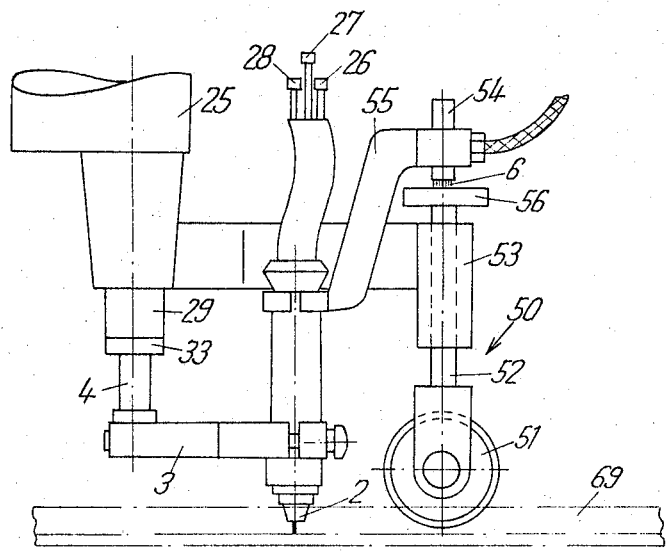
FIG. 5 is an end view of another embodiment of the invention.
Figure 6:
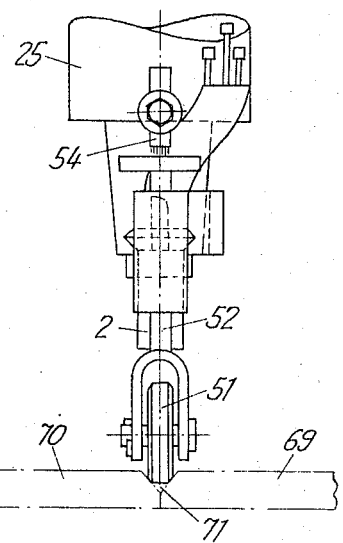
FIG. 6 is a side view of the arrangement shown in FIG. 5.

FIGS. 5–6 show an arrangement wherein sheet metal pieces 69, 70 are provided with an edge finishing, e.g. for a V-seam 71. In this arrangement the surface of the welding edge or seam 71 is used to determine the torch distance. For this purpose it is proposed to direct Pitot tube 54 (attached to torch 2) to a scanner 50 which scans the welding edges and is guided along in the prepared V-seam of the two sheets of steel.

As shown in FIGS. 5 and 6, the scanning device 50 consists of a wheel 51 which turns or rotates on a connecting rod 52 which in turn is slidably guided in vertical direction in a holder 53. The holder 53 is attached to a fixed part 25 (FIG. 2) of the torch adjustment device. Instead of a wheel, a ball end can also be used.

Pitot tube 54 is connected with torch 2 by means of support 55, and the stream of air issued from the Pitot tube is directed to a reflecting plate 56 attached to the upper end of connecting rod 52. The effect of the torch height adjustment takes place in the same manner as shown in FIG. 1.

Instead of a scanning device 50 of FIGS. 5 and 6, the arrangement of FIGS. 7–8 utilize two Pitot tubes each of which is directed toward the slanted surface 71 of a piece of sheet metal 69, 70. The Pitot tubes 57, 58 are attached to a tube 59 which is fixed to torch 2. Connected to the Pitot tubes are conduits 60, 61 which lead to a membrane control 13' in the manner described in FIG. 4.

Heretofore the invention has been described in its use with respect to regulation of the torch having a constant distance from one or two sheet metal surfaces. The same device, however, is also usable for the guiding the torch along an edge, welding, joint, or the like. For this purpose, with a device as shown in FIG. 1, it is merely necessary to swing at 90° the height adjustment device attached to plate 62 so that geared rack 32 is no longer vertical to sheet metal 1 but is instead parallel to it; and to swing at 90° the torch 2 with Pitot tube 5 after a completed swivel of the height adjustment device so that both are again vertical to sheet metal 1. For this purpose, Pitot tube 5 is adjusted to the edge of the sheet metal in such a manner that only about half of the air stream hits the sheet metal surface. In the relative movement of the torch to the work piece, the Pitot tube takes over the determination of the direction of movement and gives a corresponding control impulse to the height (in this case side adjustment device) in the change of the free Pitot tube profile or of the profile of the light beam falling on the work piece surface.

Figure 9:
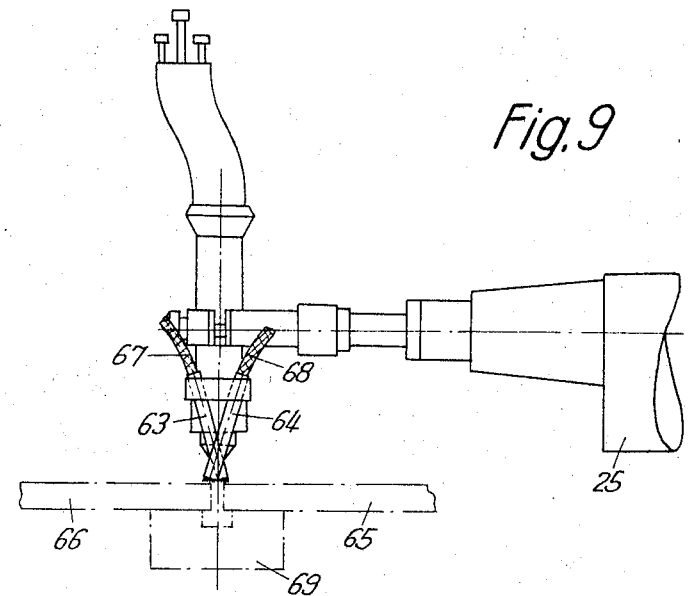
FIG. 9 is an end view of a further embodiment of this invention.
Figure 10:
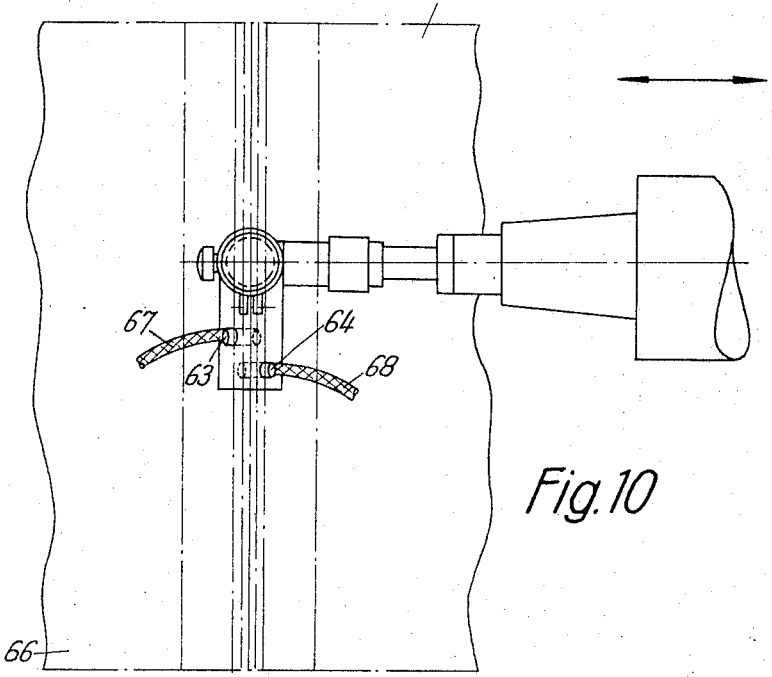
FIG. 10 is a top view of the embodiment shown in FIG. 9.

In place of a single Pitot tube, there can also be arranged for the side control two Pitot tubes 63, 64 as shown in FIGS. 9 and 10. Each Pitot tube with its nozzle point is adjusted to the respective edge of the sheet of metal 65 or 66. In connection with narrow air gaps, it is advantageous to direct the Pitot tubes not vertically but transversely against the edge, as shown in FIG. 9. Conduits 67, 68 lead from the Pitot tubes to a diaphragm control which corresponds to that of FIG. 4. The diaphragm control transmits the control impulses to the height, now side adjusting device, in the manner described in FIG. 4. A welding bath support is designated as 69.

For sheet metal with edge finishing, the device of FIGS. 7 and 8 can also be used for side control. Even here it is only necessary to swing at 90° the height adjustment device, the torch, and the Pitot tube.

The same holds true with respect to the device according to FIGS. 5 and 6; even this can be used with the same diaphragm for the side control.

In welding or cutting of work pieces arranged in a vertical or tilted manner, the torch and the Pitot tube need only be moved at 90° or correspondingly for the side control.

The invention is not limited to welding steel sheets joined flush to each other or provided with an edge finishing arranged on a plane, but it can also be used for fillet weld; the torch and thus also the Pitot tube being set up at a diagonal. The invention can furthermore be used even for welding tubes and for welding tube lids. The invention is even relevant to contour welding with simultaneously moved torch and workpiece.

The arrangement of a torch height adjustment device together with a torch side adjustment device is also part of the invention. The devices are affected by a special membrane control.

According to a further proposal, in place of air, a protective gas or a protective gas mixture is blown from the Pitot tube in connection with electric arc welding, and oxygen in connection with gas cutting.

In the examples shown, the activation of the torch height- or side adjustment device takes place hydraulically. However, it is also possible to carry out the activation pneumatically or under certain circumstances by means of electric motor.

Obviously many modifications and variations of the above invention are possible in light of the above teachings. It is therefore to be understood that within the scope of the appended claims the invention may be practiced otherwise than as specifically described.

What is claimed is:

1. An apparatus for maintaining a distance between a torch and a work piece during the relative movement of said torch with respect to the work piece comprising a torch, distance adjusting means connected to said torch, Pitot tube means connected to said torch, said tube means having a gas stream directed toward the plane of the work piece and having a velocity head, and control means actuated by the velocity head for controlling the operation of said adjusting means.

2. An apparatus as set forth in claim 1 wherein said Pitot tube means is a bent Pitot tube having an elliptical orifice.

3. An apparatus as set forth in claim 1 wherein said Pitot tube means are disposed at the side of said torch as seen in the direction of movement of said torch.

4. An apparatus as set forth in claim 1 wherein said control means includes work piece scanning means, a deflecting plate mounted on said scanning means, and said gas stream being directed toward said deflecting plate.

5. An apparatus as set forth in claim 4 wherein said scanning means includes a rotatable contact member having a circular contact surface.

6. An apparatus as set forth in claim 1 wherein said Pitot tube means are two Pitot tubes connected to said torch, said control means including a movable membrane, an each of said Pitot tubes communicating with a different side of said membrane.

7. An apparatus as set forth in claim 6 wherein said Pitot tubes are inclined with respect to the plane of said work piece.

8. An apparatus as set forth in claim 1 wherein said torch is a welding torch, and said Pitot tube means are disposed in front of said torch as seen in the direction of its movement.

9. An apparatus as set forth in claim 1 wherein said torch is a cutting torch, and said Pitot tube means are disposed in back of said torch as seen in the direction of its movement.

10. An apparatus as set forth in claim 1 wherein said Pitot tube means are arranged for directing only a portion of the gas stream against the work piece.

References Cited

UNITED STATES PATENTS

| 2,747,152 | 5/1956 | Greene | 219—125 |
| 3,135,857 | 6/1964 | Voros | 219—125 |
| 3,171,012 | 2/1965 | Morehead | 219—124 |
| 3,209,121 | 9/1965 | Manz | 219—125 |
| 3,217,204 | 11/1965 | Nance | 219—125 |
| 3,262,006 | 7/1966 | Sciaky et al. | 219—125 |
| 3,290,032 | 12/1966 | Brouwer | 219—125 |

RICHARD M. WOOD, *Primary Examiner.*

W. D. BROOKS, *Assistant Examiner.*

U.S. Cl. X.R.

314—61